UNITED STATES PATENT OFFICE.

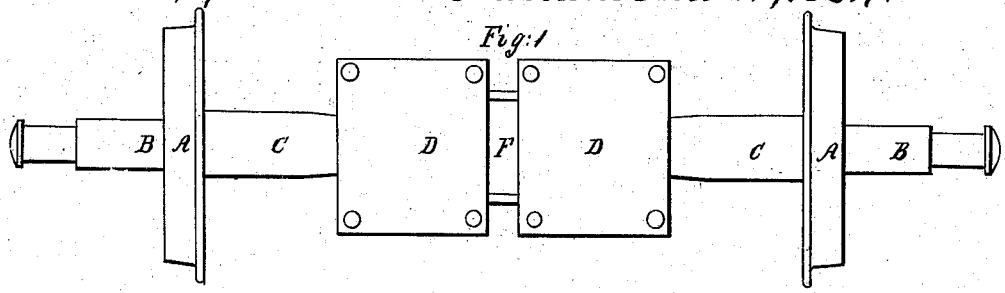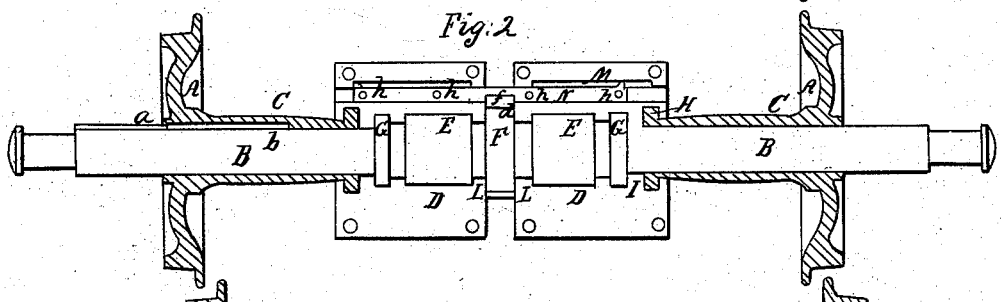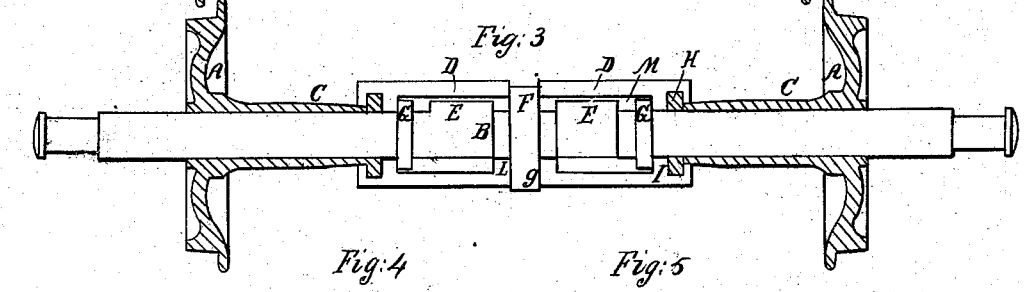

CHARLES D. TISDALE, OF EAST BOSTON, ASSIGNOR TO HIMSELF AND BARNA W. TISDALE, OF BOSTON, MASSACHUSETTS.

IMPROVEMENT IN RAILWAY-TRUCKS ADAPTED TO DIFFERENT GAGES OF TRACKS.

Specification forming part of Letters Patent No. 43,163, dated June 14, 1864.

*To all whom it may concern:*

Be it known that I, CHARLES D. TISDALE, a resident of East Boston, in the county of Suffolk and State of Massachusetts, have invented a new and useful mechanism having reference to a railway-carriage constructed so as to enable the two wheels of each of its axles to be moved in a direction either away from or toward each other, as circumstances may require, in order to adapt the carriage to tracks of different gages; and I do hereby declare that the same is fully described in the following specification and represented in the accompanying drawings, of which—

Figure 1 is a top view of two wheels and one axle provided with my invention. Fig. 2 is a horizontal and longitudinal section, and Fig. 3 a vertical and longitudinal section, of them. Fig. 4 is a top view of the lower half of one of the clutch-boxes, hereinafter described. Fig. 5 is an under side view of the upper half of such clutch-box. Fig. 6 is a top view of the axle as separate from the wheels. Fig. 7 is a transverse section of the axle, taken through the stopper, which is at its middle. Fig. 8 is a transverse section of the axle, taken through one of the clutches. Fig. 9 is a transverse section of one of the clutch-boxes and axle.

My invention is a new mechanism for locking each of the wheels in either of its positions on the axle, whether for a track of one gage or for one of different gage.

For the carrying out of my said invention each of the wheels A A should be applied to the axle B by means of a sleeve or tubular shaft, C, having the wheel fixed to it at or near one end of it, such sleeves being made to encompass the axle B. Each wheel A, with its sleeve or tubular shaft C, should be capable of being slid longitudinally on the axle, and one of the shafts C and the axle may have a "feather-connection," in order to prevent the hollow shaft from revolving on the axle. In other words, there may be such a feather-connection or its equivalent to such shaft C, in which case the other shaft would be free to revolve on and independently of the axle in, order to enable its wheel to revolve either faster or slower than the other wheel, as circumstances may require, while the wheels may be traveling on a curved railway-track.

Such a feather-connection consists of a tongue or rib, *a*, and a corresponding groove, *b*, the said tongue being made to project from the axle and into the groove made longitudinally in the inner surface of the hollow shaft.

In carrying out my invention I make use of a clutch-box, D, to each tubular shaft C, and, furthermore, I employ a semicircular projection or clutch, E, to operate with the clutch-box. The clutch E is affixed to the axle B or projects from it and goes around it one hundred and eighty degrees, or thereabout, and it is arranged a short distance from what I term the "stopper," F, which is placed at the middle of the shaft and formed as shown in the drawings. There should be one of the said clutches to each clutch-box, and consequently there will be such a clutch on each side of the stopper, it being arranged between the stopper and one of two flanges, G G, which encompass and extend from the axle B. There is a similar flange, H, fixed on the inner end of each of the sleeves or tubular shafts C C. This latter flange H enters a corresponding annular space, I, made in the clutch-box, and serves not only to connect the clutch-box to the sleeve, but to allow the former to be revolved on the latter.

Each clutch-box, as constructed, has a cylindrical chamber, K, formed within it, the diameter of such chamber being equal to or a little greater than that of the clutch. The lower half of the chamber of the clutch-box has a semicircular flange, L, at its end which is next to the stopper F. Furthermore, each half of the clutch-box is provided with a groove or chamber, M, of the form shown in Figs. 4 and 5, such grooves being for the reception of a bolt or slider, N, which is formed as shown in Fig. 2, and more especially in Fig. 10, which is a top view of the bolt. This bolt enters both of the clutch-boxes and with the stopper operates to determine the extent of rotary motion of the clutch-boxes on the axle in order to enable them to be moved over and receive the clutches or be drawn off the clutches, as circumstances may require. The bolt and stopper also serve to prevent the clutch-boxes from being rotated on the shaft after the wheels may have been adjusted for any gage of a track. The stopper F has two shoulders, *c c*, and two notches or recesses, *d d*, arranged within it, as shown in Fig. 7, the arrangement of the shoulders being such as to cause one of them to estop the bolt, when it may be turned with the clutch-boxes about the shaft and into the proper position for moving the clutches either into or out of the clutch-boxes. The position of the other shoulder c is such as to estop the bolt when the clutch-boxes are revolved one hundred and eighty degrees from the said position, in which case the clutches will be against the semicircular flanges of the clutch-boxes and will hold the wheel-shaft to the narrower gage. By revolving the clutch-boxes and their bolt on their axle until the bolt may be brought up against the proper shoulder c, each of the clutch-boxes and its shaft C can be drawn away from the other clutch-box and on the axle, so as to separate the wheels for the broader track or gage of track. On the accomplishment of the movement of the wheels in directions apart from one another the clutch-boxes and the bolt should be caused to make another semi-revolution on the shaft, in which case the clutch-boxes will be in positions to prevent the wheels from being moved toward one another. The bolt has a notch, f, at its middle, which receives the part g of the stopper while the clutch-boxes and the bolt may be in the act of being turned around on the shaft. The bolt is also provided with four holes, h h h h. There is also a hole, i, made through each clutch-box, it being so situated that a pin may be passed through it as well as through either of the holes of the next adjacent half of the bolt. By moving the bolt lengthwise into one of the notches d d and passing pins through holes of the two clutch-boxes and the bolt, the stopper will operate to prevent the clutch-boxes from being turned on the shaft. This can be done whether the wheels are adjusted for the narrower or the wider track.

I claim—

1. The application of the wheels to the axle by means of sleeves or tubular shafts, as described, and combining with the latter and the axle a means or mechanism for fixing the sleeves at different distances apart on the axle, in order to adapt the wheels to tracks of different gages, in manner as specified.

2. The combination of the clutch-box D, the flanges G H, and the semicircular clutch E, the same being made and applied together and to the axle B and the tubular shaft or wheel-sleeve c, and so as to operate substantially as specified.

3. The combination of the stopper F and the bolt N, the two clutch-boxes D D, and their clutches E E, the whole being constructed and applied to and so as to operate with the axle and the wheel-sleeves or hollow shafts, substantially as hereinbefore explained.

4. With the wheels applied to the axle by means of sleeves or tubular shafts, as described, and these latter and the axle provided with a means or mechanism for fixing the sleeves at different distances apart on the axle, and for the purpose of adapting the wheels to tracks of different gages, the application of a feather connection—viz., the rib a and groove b—or its mechanical equivalent, to one of the sleeves only of the axle, the other sleeve being free to revolve as well as to slide on the axle.

C. D. TISDALE.

Witnesses:
   R. H. EDDY,
   F. P. HALE, Jr.